(12) United States Patent
Henke

(10) Patent No.: US 11,745,852 B2
(45) Date of Patent: Sep. 5, 2023

(54) FLIGHT CONTROL SYSTEM FOR AN AIRCRAFT

(71) Applicant: EnExSys Research Inc., Abbotsford (CA)

(72) Inventor: James Henke, Abbotsford (CA)

(73) Assignee: ENEXSYS RESEARCH INC., Abbotsford (CA)

( * ) Notice: Subject to any disclaimer, the term of this patent is extended or adjusted under 35 U.S.C. 154(b) by 0 days.

(21) Appl. No.: 18/071,469

(22) Filed: Nov. 29, 2022

(65) Prior Publication Data

US 2023/0097601 A1 Mar. 30, 2023

Related U.S. Application Data

(62) Division of application No. 17/922,015, filed as application No. PCT/CA2020/051125 on Aug. 17, 2020.

(51) Int. Cl.
| | | |
|---|---|---|
| *B64C 9/04* | (2006.01) | |
| *B64C 9/06* | (2006.01) | |
| *B64C 9/18* | (2006.01) | |
| *B64C 27/06* | (2006.01) | |
| *B64C 27/82* | (2006.01) | |
| *B64C 3/54* | (2006.01) | |

(Continued)

(52) U.S. Cl.
CPC ............... *B64C 3/546* (2013.01); *B64C 1/26* (2013.01); *B64C 3/185* (2013.01); *B64C 9/04* (2013.01); *B64C 9/06* (2013.01); *B64C 9/18* (2013.01); *B64C 27/06* (2013.01); *B64C 27/82* (2013.01); *B64C 2027/8272* (2013.01)

(58) Field of Classification Search
CPC .... B64C 5/10; B64C 5/08; B64C 3/50; B64C 9/18; B64C 2027/8272
See application file for complete search history.

(56) References Cited

U.S. PATENT DOCUMENTS 1,916,475 A * 7/1933 Hall .......................... B64C 9/02
244/212
1,977,724 A 10/1934 Hays
(Continued)

FOREIGN PATENT DOCUMENTS

CN 107738745 2/2018
FR 2670744 A1 6/1992

*Primary Examiner* — Tien Q Dinh
*Assistant Examiner* — William L Gmoser
(74) *Attorney, Agent, or Firm* — KIRTON McCONKIE; Evan R. Witt

(57) ABSTRACT

A simple, safe, and inexpensive flight control system in an aircraft. An anti-torque system for a rotary-wing aircraft has an airfoil with a first surface extending from a first trailing edge and a leading edge, and a second surface extending from a second trailing edge to join the first surface at the leading edge. The airfoil has a first moveable deflector panel pivotally coupled to the first trailing edge, and a second moveable deflector panel pivotally coupled to the second trailing edge. Means are provided to pivot the deflector panels in unison about their respective pivot axes to alter the direction of travel of the airflow downstream of the pivot axes over the surfaces of the deflector panels, thereby producing a lift in a direction perpendicular to the airflow to counteract the torque applied on the aircraft. The flight control system may be arranged within a fixed-wing aircraft.

3 Claims, 6 Drawing Sheets

(51) Int. Cl.
*B64C 1/26* (2006.01)
*B64C 3/18* (2006.01)

(56) References Cited

U.S. PATENT DOCUMENTS

| | | | | |
|---|---|---|---|---|
| RE20,075 E | * | 8/1936 | Barnhart | B64C 5/08 |
| | | | | 244/215 |
| 2,166,292 A | * | 7/1939 | Hall | B64C 9/18 |
| | | | | 244/212 |
| 2,279,615 A | | 4/1942 | Bugatti | |
| 2,978,204 A | | 4/1961 | Davidson | |
| 4,708,305 A | | 11/1987 | Kelley et al. | |
| 4,717,097 A | * | 1/1988 | Sepstrup | B64C 3/50 |
| | | | | 244/90 R |
| 5,209,430 A | | 5/1993 | Wilson et al. | |
| 5,437,419 A | | 8/1995 | Schmitz | |
| 5,655,737 A | * | 8/1997 | Williams | B64C 3/50 |
| | | | | 244/215 |
| 5,887,828 A | * | 3/1999 | Appa | B64C 9/18 |
| | | | | 244/90 R |
| 6,755,374 B1 | | 6/2004 | Carson | |
| 2010/0032517 A1 | | 2/2010 | Botich | |
| 2010/0140393 A1 | | 6/2010 | Bender | |
| 2011/0135472 A1 | * | 6/2011 | Cazals | B64C 9/16 |
| | | | | 416/23 |
| 2013/0087653 A1 | | 4/2013 | Brand et al. | |

\* cited by examiner

FLIGHT CONTROL SYSTEM FOR AN AIRCRAFT

CROSS-REFERENCE TO RELATED APPLICATIONS

This application is a divisional application of application Ser. No. 17/922,015, filed, Oct. 28, 2022, which was the National Stage of International Application No. PCT/CA2020/051125, filed Aug. 17, 2020.

FIELD OF THE INVENTION

The invention pertains to systems for providing flight control in an aircraft, and an aircraft incorporating the flight control system.

BACKGROUND

Systems for providing anti-torque and yaw control in an aircraft such as a helicopter are known in the art. A prevalent means for providing yaw control and for counteracting the biasing torque by the main rotor in an aircraft is to place a spinning blade, known as a tail rotor, at the end of the tail boom of the aircraft. Tail rotors, however, possess a number of safety risks. For example, tail rotors present a safety risk to ground personnel working in the vicinity of the aircraft. Inadvertent contact between tail rotors and stationary objects on the ground is also a common cause of accidents.

Alternative means for providing anti-torque and yaw control in an aircraft have been considered. One of such means include replacing tail rotors with multi-bladed ducted fans; however, the unrestricted access to the spinning blades still raises safety concerns. Another one of such means include the use of multi-bladed variable pitch fans arranged within the forward section of the tail boom where it is not accessible during operation. The operation of multi-bladed fan systems disadvantageously requires a substantial amount of the aircrafts' engine power to operate, which leaves less power for the main rotor system.

U.S. Pat. No. 5,209,430 published on May 11, 1993 and U.S. Pat. No. 4,708,305 published on Nov. 24, 1987 disclose a supplemental strake system for providing anti-torque and yaw control. Such supplemental strake systems provide only slight reductions in the amount of engine power required to operate tail rotors.

Conventional means for providing flight control in a fixed-wing aircraft include pivotally mounting a single control surface such as an aileron, elevator and rudder onto a wing, horizontal stabilizer and vertical stabilizer, respectively of the aircraft.

There is a need for a system with a simple, safe and energy-efficient mechanism to provide flight control in an aircraft. The present invention is directed to an improved flight control system for rotary-wing and fixed-wing aircrafts.

SUMMARY

The invention provides a flight control system for an aircraft. In one embodiment of the invention, the flight control system is an anti-torque system for an aircraft. The anti-torque system has an airfoil with a first surface extending from a first trailing edge and a leading edge, and a second surface extending from a second trailing edge to join the first surface at the leading edge. A first moveable deflector panel is pivotally coupled to the first trailing edge, and a second moveable deflector panel is pivotally coupled to the second trailing edge. Means are provided to pivot the first and second deflector panels in unison about their respective pivot axes. Selectively pivoting the first and second deflector panels to the left side or the right side of the centerline of the airfoil alters the direction of travel of the airflow downstream of the pivot axes of the deflector panels over the surfaces of the deflector panels, thereby producing a lift in a direction perpendicular to the downward airflow from the main rotor to counteract the torque applied on the aircraft.

Another aspect of the invention provides a rotary-wing aircraft which incorporates the anti-torque system. The rotary-wing aircraft has a main rotor, a fuselage suspended below the main rotor, and an elongated tail boom projected rearwardly from the fuselage and extending through an area of vertical downwash produced by the rotation of the main rotor. The airfoil may be arranged to encase or be fitted to at least a portion of the tail boom, with the leading edge oriented upwardly and the deflector panels oriented downwardly. The rotary-wing aircraft may also include a vertical fin. A second airfoil may be arranged to encase or be fitted to at least a portion of the vertical fin, with the leading edge oriented forwardly and the deflector panels oriented rearwardly. The second airfoil performs the same torque-control function as a rudder control surface on an aircraft, but provides a more energy efficient means.

In another embodiment of the invention, a flight control system is incorporated into a fixed-wing aircraft. The flight control system may be provided to replace one or more conventional fixed wing controls arranged in a wing, horizontal stabilizer and/or vertical stabilizer. In an example embodiment, the flight control system is arranged in a wing. The wing has an airfoil profile having a leading edge oriented forwardly, a trailing edge oriented rearwardly, and opposed first and second side edges connecting the leading edge to the trailing edge. The wing has a rear spar extending spanwise between the first and second side edges, a first surface extending from a first edge of the rear spar to the leading edge, and a second surface extending from an opposed second edge of the rear spar to the leading edge to join the first surface. First and second moveable deflector panels are pivotally coupled to the first and second edges of the rear spar, respectively. Means are provided to pivot the first and second moveable deflector panels about first and second pivot axes respectively. Pivoting of the deflector panels deflects air passing over them, and thereby generating a force to rotate the aircraft about its roll axis. The flight control system may be similarly arranged on the horizontal and/or vertical stabilizers to rotate the aircraft about the associated axis.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
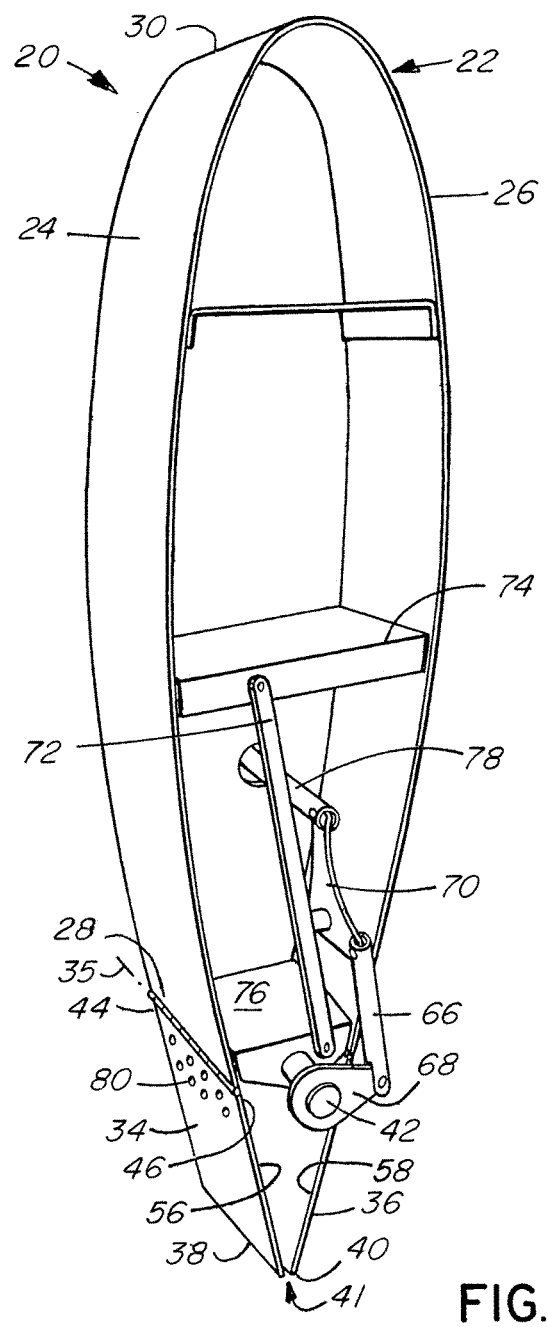
FIG. 1 is a perspective view of an anti-torque system according to one embodiment of the invention.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

Figure 5:
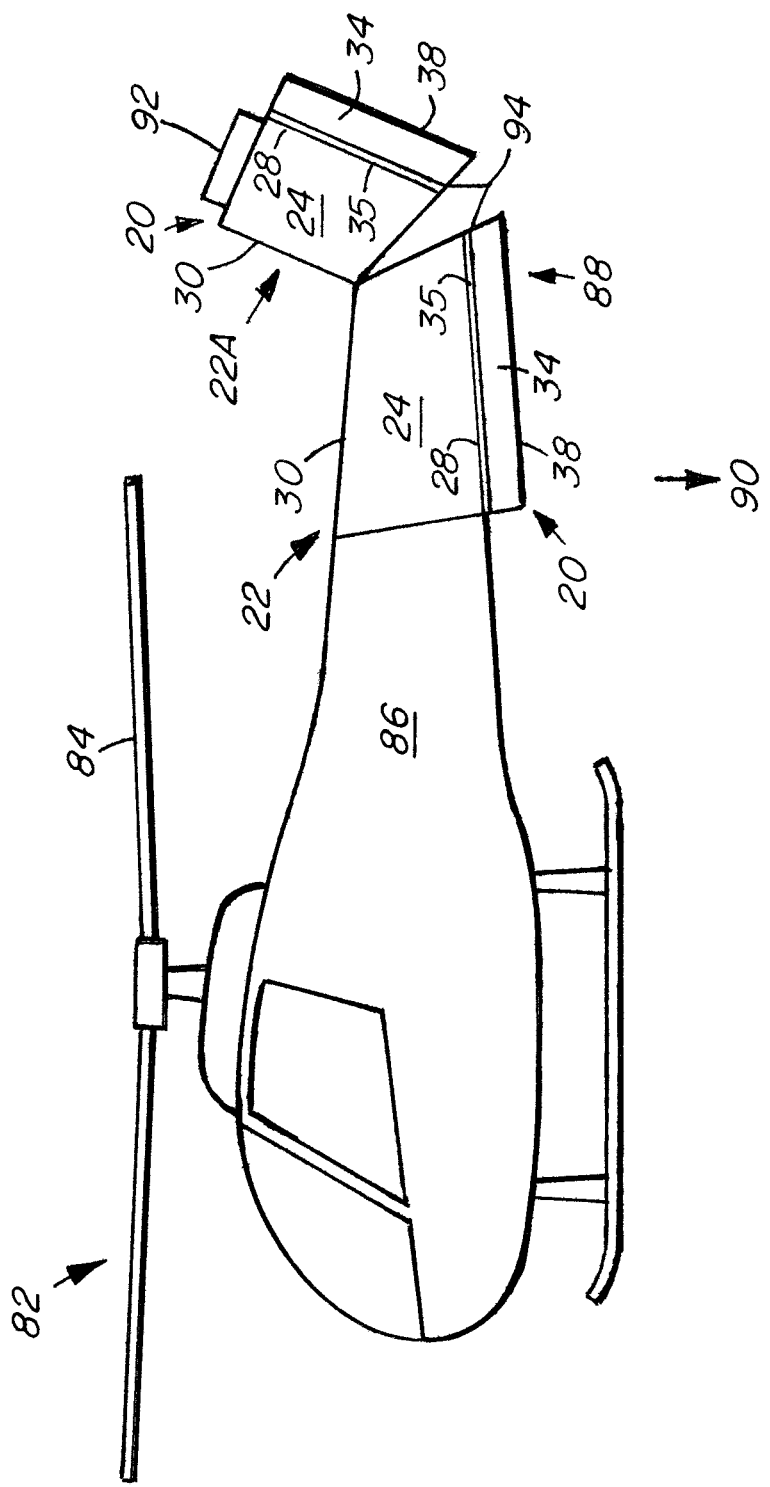
FIG. 5 is a side elevational view of a rotary-wing aircraft incorporating two anti-torque systems of FIG. 1.

As used herein, the directional terms "upward", "downward", "forward", and "rearward" are used to indicate relative positions in the context of an aircraft as it would be positioned in straight and level flight as illustrated in FIG. 5.

Figure 2:
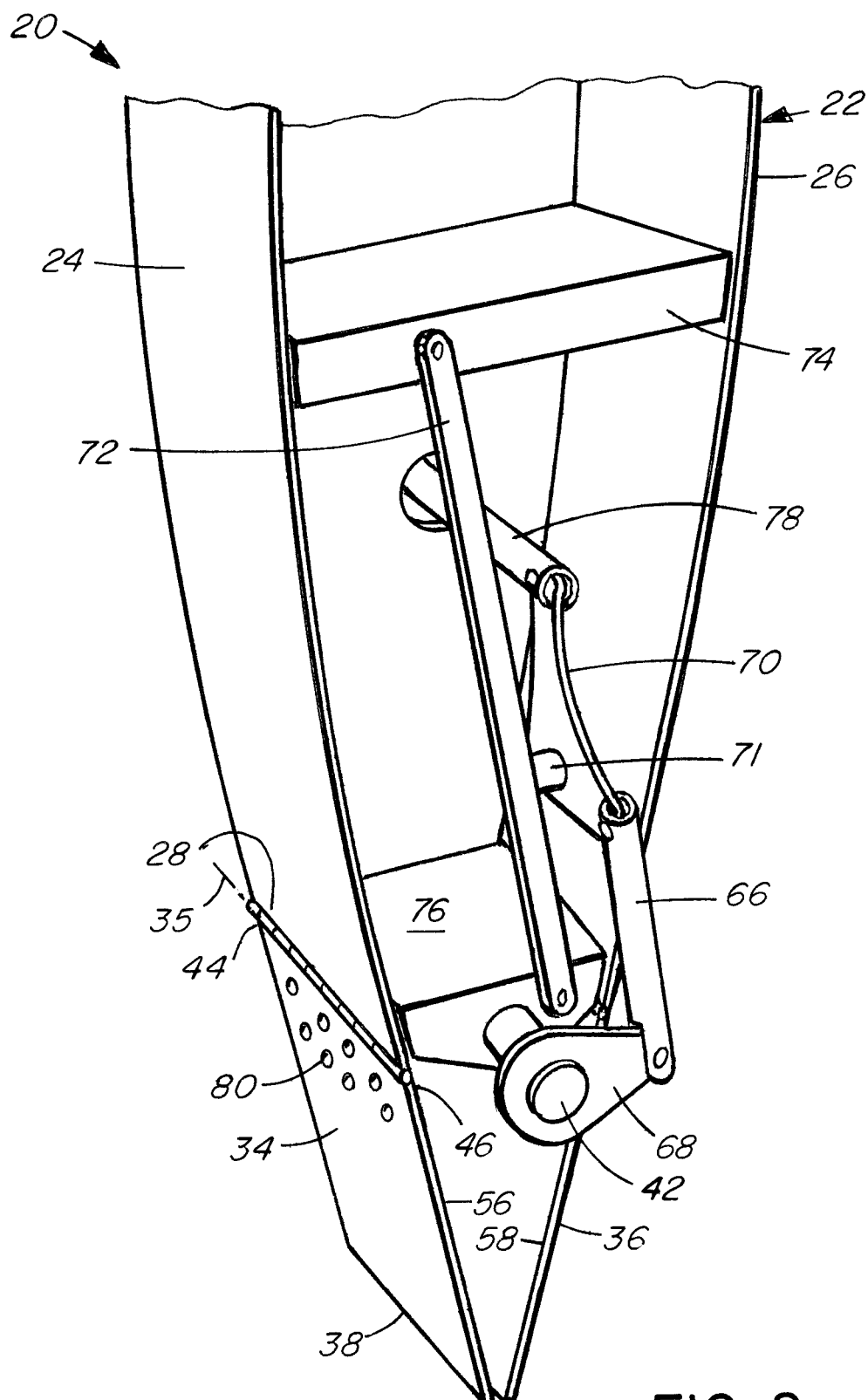
FIG. 2 is a partial perspective view of the anti-torque system of FIG. 1, showing the mechanism of rotating the shaft of the anti-torque system.
Figure 3:
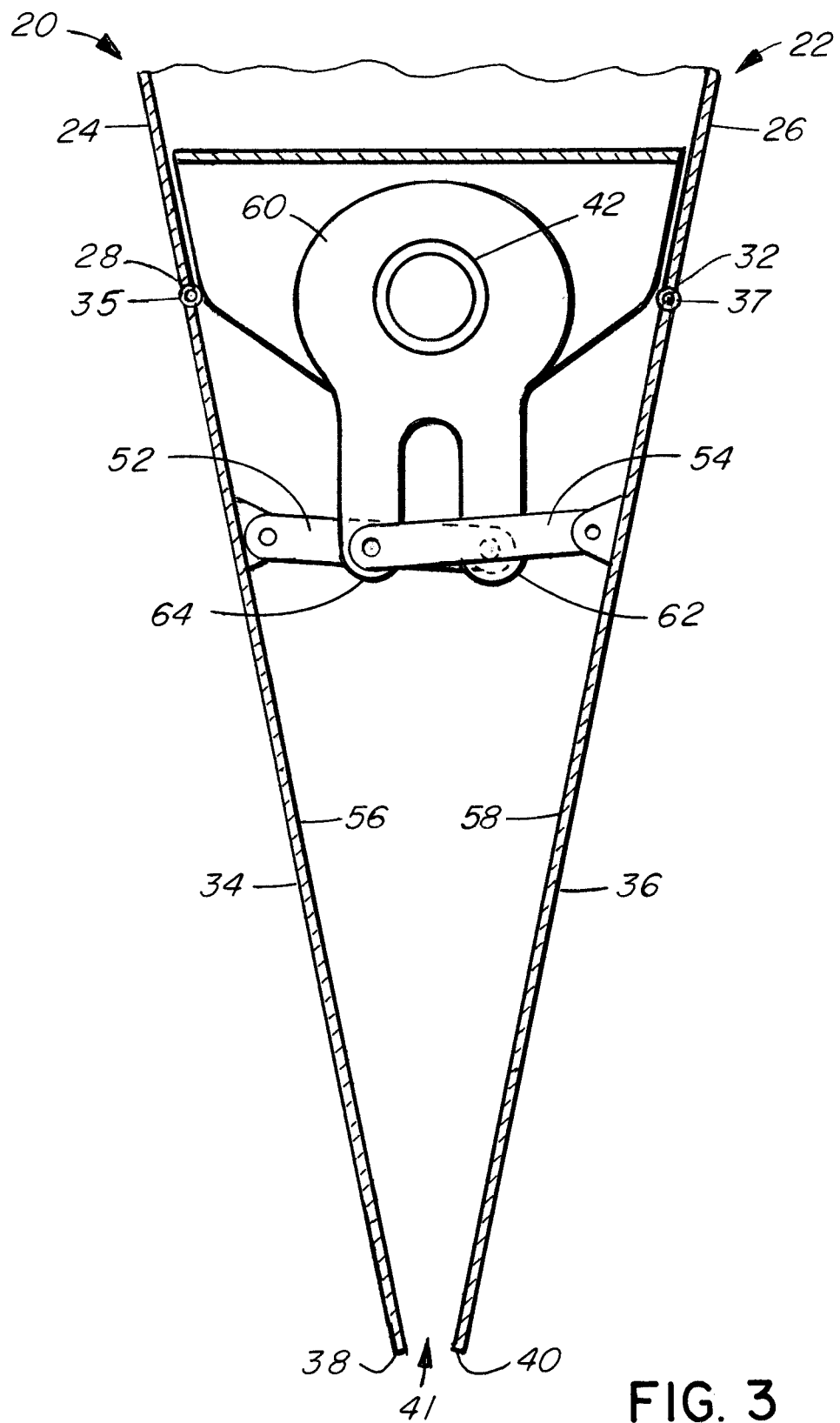
FIG. 3 is a partial cross-sectional view of the anti-torque system of FIG. 1, showing the mechanism of pivoting the moveable deflector panels of the anti-torque system.

Referring to FIGS. 1 to 3, in one embodiment, the system of the invention pertains to an anti-torque system 20 for an aircraft. The aircraft may for example be a rotary-wing aircraft such as a helicopter. The system 20 has an airfoil 22. The airfoil 22 has a first surface 24 extending from a first trailing edge 28 to a leading edge 30, and a second surface 26, opposite to the first surface 24, extending from a second trailing edge 32 to join the first surface 24 at the leading edge 30. A first moveable deflector panel 34 is pivotally coupled to the first trailing edge 28, and a second moveable deflector panel 36, opposite to the first deflector panel 34, is pivotally coupled to the second trailing edge 32. The pivotal coupling may be by means of hinges. The first 34 and second 36 deflector panels converge inwardly from the respective trailing edges 28, 32 toward the respective terminal ends 38, 40. The terminal ends 38, 40 of the first 34 and second 36 deflector panels are separated by a calibrated gap 41. A plurality of orifices 80 may be defined on the first 34 and second 36 deflector panels. The orifices 80 are arranged proximate to the respective first 28 and second 32 trailing edges, downstream of the pivoting axes of the trailing edges 28, 32. The airfoil 22 is symmetrical in its neutral position, where the first 24 and second 26 surfaces are symmetrically arranged about a centerline extending through the leading edge 30 of the airfoil 22.

Means are provided between the first 24 and second 26 surfaces for pivoting the first 34 and second 36 deflector panels, in unison, about their respective pivot axes. Suitable means of pivoting the first 34 and second 36 deflector panels may include any one of an electrical, hydraulic, mechanical, pneumatic mechanism, or a combination thereof. FIG. 3 illustrates an example mechanism. A circular, elongated, shaft 42 extends spanwise within the airfoil 22, between opposing edges 44, 46 of the first trailing edge 28. The shaft 42 may be arranged at a midpoint between the first trailing edge 28 and the second trailing edge 32. A first connector plate 60 is arranged inside the airfoil 22 and secured on the shaft 42 at a point along the length of the shaft 42. The first connector plate 60 has first 62 and second 64 linkage members projecting from the shaft 42 to pivotally couple first 52 and second 54 levers to the shaft 42 respectively. The first lever 52 is pivotally coupled to an inner surface 56 of first deflector panel 34 at one end, and to the first linkage member 62 at the opposite end. The second lever 54 is pivotally coupled to an inner surface 58 of the second deflector panel 36 at one end, and to the second linkage member 64 at the opposite end.

Means are provided to rotate the shaft 42 about its longitudinal axis. Rotation of the shaft 42 along its longitudinal axis pivots the first 52 and second 54 levers, and thereby pivots the first 34 and second 36 deflector panels about their pivot axes 35, 37, respectively. Suitable means of rotating shaft 42 may include any one of an electrical, hydraulic, mechanical, pneumatic mechanism, or a combination thereof. FIG. 2 illustrates an example mechanism. A connecting rod 66 is pivotally coupled to a second connector plate 68 secured to an end of the shaft 42 at one end, and to a pivot arm 70 at an opposite end. The pivot arm 70 is pivotally coupled to an elongated bar 72 which is secured to the airfoil 22 for supporting a pivot axis 71 of the pivot arm 70. In the example embodiment, the elongated bar 72 is mounted to a first support member 74 extending between the first 24 and second 26 surfaces at one end, and to a second support member 76, spaced apart from and extends parallel to the first support member 74, at the opposite end. The second support member 76 may be secured to the shaft 42. The pivot arm 70 pivotally couples the connecting rod 66 to a control rod 78 which extends spanwise within the airfoil 22, parallel to the longitudinal length of the shaft 42. The control rod 78 is moveable in the spanwise direction within the airfoil 22. Movement of the control rod 78 in the spanwise direction pivots the pivot arm 70 and the connecting rod 66 about the respective pivot axes, and thereby rotates the shaft 42 about its longitudinal axis. The control rod 78 may be coupled to a control system in an aircraft, so that the movement of the control rod 78 may be controlled by an operator during operation.

Figure 4A:
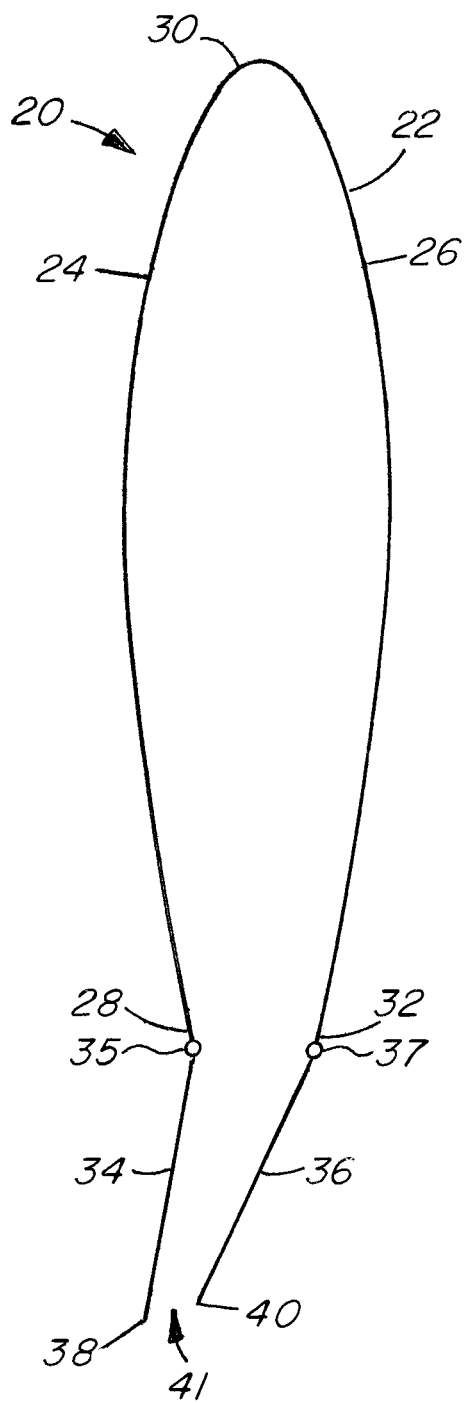
FIGS. 4A and 4B are schematic diagrams illustrating the anti-torque system of FIG. 1 with moveable deflector panels being pivoted to the left and right sides of the centerline of the airfoil respectively.
Figure 4B:
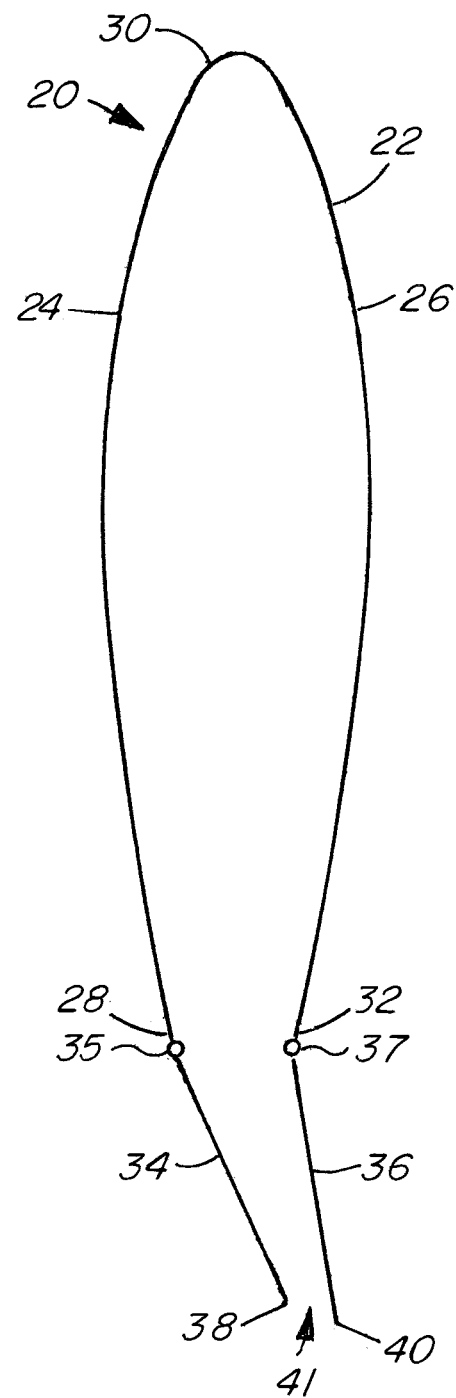

The shaft 42 is rotatable in a clockwise or a counterclockwise direction in the view of FIG. 3 to selectively pivot the deflector panels 34, 36 about the respective pivot axes to a left side or a right side of the centerline of the airfoil 22 respectively. Pivoting the deflector panels 34, 36 about their respective pivot axes changes the profile of airfoil 22 from a symmetrical profile when the deflector panels 34, 36 are in the neutral position to an asymmetrical profile when the deflector panels 34, 36 are in a deflected position. FIGS. 4A and 4B illustrate the deflector panels 34, 36 being deflected to the left and right sides of the centerline respectively. The deflector panels 34, 36 are deflectable to any allowable pivot angle over the full pivot range (e.g., up to the maximum allowable pivot angle), controlled by the rotation angle of the shaft 42.

An example application of the anti-torque system 20 to a rotary-wing aircraft 82 is illustrated in FIG. 5. The aircraft 82 is a helicopter having a main rotor 84, a fuselage 86 suspended below the main rotor 84, an elongated tail boom 88 projecting rearwardly from the fuselage 86 and extending through an area of vertical downwash 90 produced by the rotation of the main rotor 84 when the aircraft is hovering or moving at relatively low forward velocities. The system 20 is used to maintain directional control of the aircraft 82 by counteracting the force that is applied to the main rotor 84 which causes the fuselage 86 to rotate or yaw about its vertical axis in a direction opposite to the rotation of the main rotor 84.

The airfoil 22 of the system 20 is arranged to encase or be fitted to at least a portion of the tail boom 88 within the outer perimeter of the main rotor downwash 90 with the leading edge 30 oriented upwardly and the deflector panels 34, 36 oriented downwardly. The airfoil 22 is mounted to the tail boom 88 at a predetermined angle of incidence, i.e., the angle between the chord line of the airfoil 22 relative to the vertical axis of the aircraft. The main rotor downwash 90 flows around the entire airfoil 22 (i.e., around the first 24 and second 26 surfaces and the surfaces of the deflector panels 34, 36) continuously during slow flight and hovering. Selectively deflecting the airflow over the surfaces of the first and second deflectors 34, 36 produces a lift in the direction opposite to that of the deflection. This lift in a direction perpendicular to the flow of the downwash 90 counteracts the main rotor torque during slow flight and hovering. The asymmetrical profile of the airfoil 22 resulting from the pivoted deflector panels 34, 36 increases the lift coefficient of the airfoil 22. The asymmetrical profiles of the airfoil 22 and therefore the lift coefficients change as the deflector panels 34, 36 are being pivoted over the full pivot range. The pivot angle of the deflector panels 34, 36, and thereby the resulting asymmetrical profile of the airfoil 22, can be adjusted to control the amount of lift to be produced by the airfoil 22 by controlling the rotation angle of the shaft 42.

The abrupt changes in the profile curve of the airfoil 22 resulting from the pivoted deflector panels 34, 36 induce air pressure changes and boundary layer turbulence on the first 24 and second 26 surfaces downstream of the pivot axes of the deflector panels 34, 36. The pivoted deflector panels 34, 36 create a positive pressure area which increases with deflection at the surface 24, 26 on which the fluid flows, and a negative pressure area which increases with deflection at the opposite surface 24, 26. To balance this pressure differential, the system 20 includes one or both of the gap 41 and/or the orifices 80 defined by the airfoil 22. The gap 41, defined by the space between the terminal ends 38, 40 of the first 34 and second 36 deflector panels, is provided to permit air that is contained between the deflector panels 34, 36 to flow past the terminal ends 38, 40 to be drawn out of the airfoil 22 through the gap 41, and thereby reducing the intensity of vortexes formed at the terminal ends 38, 40. The plurality of orifices 80 on the deflector panels 34, 36 is provided to permit any turbulent high pressure air that is generated on an outer surface of one of the deflector panels 34, 36 to flow through the orifices 80 into a space within the airfoil 22 between the deflector panels 34, 36 to an outer surface of the opposite deflector panel 34, 36 so as to balance the turbulent low pressure air generated on the outer surface of the opposite deflector panel 34, 36, and thereby offsetting the pressure differentials and maintaining a smooth flow of air around the airfoil 22.

Referring to FIG. 5, the rotary-wing aircraft 82 may also include a vertical fin 92. The term "vertical" is not limited to a direction that is perpendicular to the longitudinal axis of the aircraft 82, or a direction that is parallel to the yaw axis of the aircraft, and can include fins that are inclined at an angle from the yaw axis. An airfoil 22 may be arranged to encase or be fitted to at least a portion of the vertical fin 92, with the leading edge 30 oriented forwardly and the trailing edges 28, 32 oriented rearwardly. The deflector panels 34, 36 of the airfoil 22 arranged on the vertical fin 92 are pivoted to alter the direction of travel of the relative horizontal airflow as it passes the downstream edges of the vertical fin 92, by selectively deflecting the layer of airflow over the surfaces of the deflector panels 34, 36 to the right or left, and thereby producing a lift in a direction perpendicular to the horizontal airflow to counteract the torque at cruise speeds.

Some embodiments of the invention include a rotary-wing aircraft with two airfoils 22 arranged to encase or be fitted to both the tail boom 88 (referred to as the "first airfoil 22") and the vertical fin 92 (referred to as the "second airfoil 22A"), providing anti-torque control and thus maintaining directional control during all flight parameters. As shown in FIG. 5, an airfoil connector 94 is provided to operatively couple the rotatable shaft 42 of the first airfoil 22 to the rotatable shaft 42 of the second airfoil 22A. The rotation of one of the shafts 42 thus rotates the other shaft 42, and thereby the deflector panels 34, 36 of the first and second airfoils 22, 22A pivot in unison and about the same pivot angles.

Figure 6:
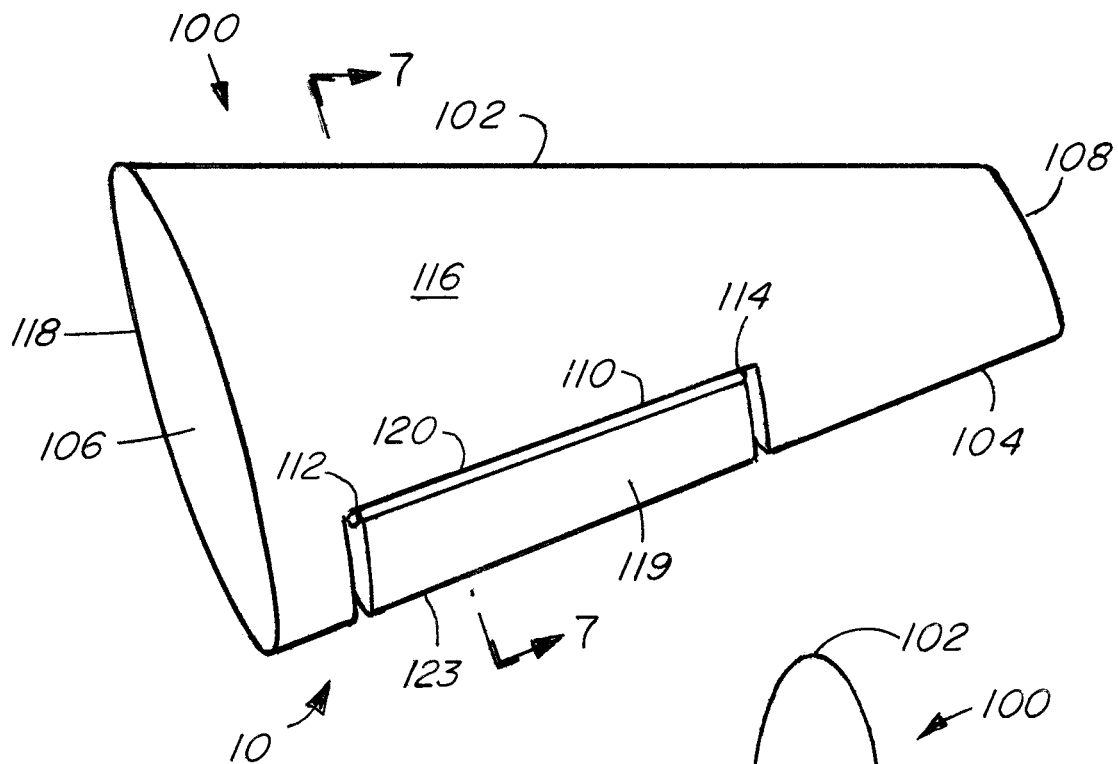
FIG. 6 is a perspective view of a wing of a fixed-wing aircraft incorporating a flight control system according to another embodiment of the invention.
Figure 7:
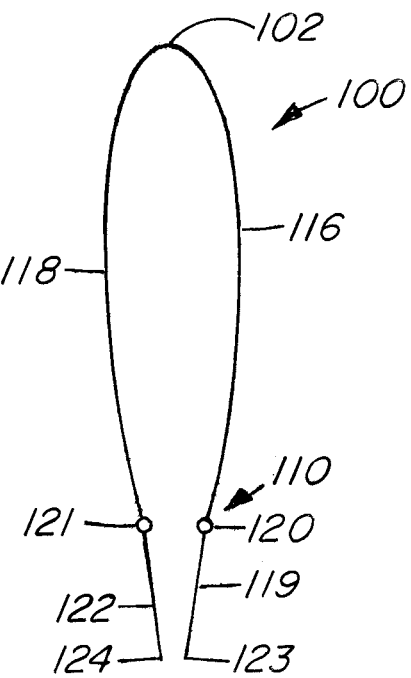
FIG. 7 is a schematic cross-sectional view taken on the line 7-7 of FIG. 6.

In a further embodiment, the flight control system 10 is arranged in a wing or a stabilizer (e.g., horizontal and vertical stabilizers) of a fixed-wing aircraft. The flight control system 10 may be provided to replace one or more conventional fixed wing controls, such as an aileron, elevator and rudder that are typically mounted on the trailing edge of a wing, horizontal stabilizer and vertical stabilizer, respectively of a fixed-wing aircraft. An example application of the flight control system 10 to a wing 100 of a fixed-wing aircraft is illustrated in FIGS. 6 and 7. The wing 100 has an airfoil profile with a leading edge 102 oriented forwardly, an opposing trailing edge 104 oriented rearwardly, and two side edges 106, 108 with one of the side edges 106 being mounted to a fuselage of the aircraft. A rear spar 110 is arranged spaced-apart from the leading edge 102, extending parallel to the trailing edge 104 in a spanwise direction from a first point 112 to a second point 114 located between the side edges 106, 108 of the wing 100. The wing 100 has a first surface 116 that extends to join an opposed second surface 118 at the leading edge 102. At least a portion of the first surface 116 extends from a first edge 120 of the rear spar 110 to the leading edge 102, and at least a portion of the second surface 118 extends from an opposed second edge 121 to join the first surface 116 at the leading edge 102. The remaining portions of the first surface 116 extend from the trailing edge 104 to the leading edge 102, and the remaining portions of the second surface 118 extend from the trailing edge 104 to join the first surface 116 at the leading edge 102.

A first moveable deflector panel 119 is pivotally coupled to the first edge 120 of the rear spar 110 extending between the first 112 and second 114 points, and a second moveable deflector panel 122, opposite to the first moveable deflector panel 118, is pivotally coupled to the second edge 121 of the rear spar 110 extending between the first 112 and second 114 points. The first edge 120 and the second edge 121 of the rear spar 110 form respective pivot axes of the first 119 and second 122 deflector panels. The deflector panels 119, 122 may converge inwardly toward their terminal ends 123, 124. Means are provided to pivot the deflector panels 119, 122 in unison and about the same pivot angles. Suitable means of pivoting the deflector panels 119, 122 may include any one of an electrical, hydraulic, mechanical, pneumatic mechanism, or a combination thereof. The example means of pivoting the deflector panels 34, 36 of the airfoil 22 can be adapted for use to pivot the deflector panels 119, 122 of the wing 100 of a fixed-wing aircraft.

In some embodiments, the entire first 116 and second 118 surfaces extend from the respective first 120 and second 121 edges of the rear spar 110 to the leading edge 102. In those embodiments, the trailing edge 104 of the wing 100 is defined by the terminal ends 123, 124 of the first and second moveable deflector panels 119, 122.

The deflector panels 119, 122 described herein may be arranged to pivotally couple to rear spars of any suitable wings or stabilizers that have symmetrical or asymmetrical airfoil profiles.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

The invention claimed is:

1. A fixed-wing aircraft comprising:
   (a) a fuselage; and
   (b) a wing mounted to the fuselage and extending laterally therefrom, the wing having:
      (i) a leading edge oriented forwardly;
      (ii) a trailing edge oriented rearwardly;
      (iii) opposed first and second side edges connecting the leading edge to the trailing edge, the first side edge being mounted to the fuselage;
      (iv) a rear spar arranged within the wing and extending spanwise between the first and second side edges;
      (v) a first surface extending from a first edge of the rear spar to the leading edge;
      (vi) a second surface extending from an opposed second edge of the rear spar to the leading edge to join the first surface;
      (vii) a first moveable deflector panel pivotally coupled to the first edge of the rear spar;
      (viii) a second moveable deflector panel pivotally coupled to the second edge of the rear spar;
      wherein the first and second moveable deflector panels converge inwardly from the respective edges of the rear spar toward respective terminal ends, the terminal ends of the first and second moveable deflector panels being separated by a gap; and
      (ix) means for pivoting the first and second moveable deflector panels in unison and about the same angle about first and second pivot axes respectively,
   wherein the means for pivoting the first and second moveable deflector panels pivots the deflector panels in unison and about the same angle, whereby the first and second deflector panels converge inwardly from the respective trailing edges toward respective terminal ends throughout the pivoting and maintain the gap between the terminal ends of the first and second moveable deflector panels.

2. A fixed-wing aircraft comprising:
   (a) a fuselage; and
   (b) a horizontal stabilizer mounted to the fuselage and extending laterally therefrom, the horizontal stabilizer having:
      (i) a leading edge oriented forwardly;
      (ii) a trailing edge oriented rearwardly;
      (iii) opposed first and second side edges connecting the leading edge to the trailing edge, the first side edge being mounted to the fuselage;
      (iv) a rear spar arranged within the horizontal stabilizer and extending spanwise between the first and second side edges;
      (v) a first surface extending from a first edge of the rear spar to the leading edge;
      (vi) a second surface extending from an opposed second edge of the rear spar to the leading edge to join the first surface;
      (vii) a first moveable deflector panel pivotally coupled to the first edge of the rear spar;
      (viii) a second moveable deflector panel pivotally coupled to the second edge of the rear spar;
      wherein the first and second moveable deflector panels converge inwardly from the respective edges of the rear spar toward respective terminal ends, the terminal ends of the first and second moveable deflector panels being separated by a gap; and
      (ix) means for pivoting the first and second moveable deflector panels in unison and about the same angle about first and second pivot axes respectively,
   wherein the means for pivoting the first and second moveable deflector panels pivots the deflector panels in unison and about the same angle, whereby the first and second deflector panels converge inwardly from the respective trailing edges toward respective terminal ends throughout the pivoting and maintain the gap between the terminal ends of the first and second moveable deflector panels.

3. A fixed-wing aircraft comprising:
   (a) a fuselage; and
   (b) a vertical stabilizer mounted to the fuselage and extending vertically therefrom, the vertical stabilizer having:
      (i) a leading edge oriented forwardly;
      (ii) a trailing edge oriented rearwardly;
      (iii) opposed first and second side edges connecting the leading edge to the trailing edge, the first side edge being mounted to the fuselage;
      (iv) a rear spar arranged within the vertical stabilizer and extending spanwise between the first and second side edges;
      (v) a first surface extending from a first edge of the rear spar to the leading edge;
      (vi) a second surface extending from an opposed second edge of the rear spar to the leading edge to join the first surface;
      (vii) a first moveable deflector panel pivotally coupled to the first edge of the rear spar;
      (viii) a second moveable deflector panel pivotally coupled to the second edge of the rear spar;
      wherein the first and second moveable deflector panels converge inwardly from the respective edges of the rear spar toward respective terminal ends, the terminal ends of the deflector panels being separated by a gap; and
      (ix) means for pivoting the first and second moveable deflector panels in unison and about the same angle about first and second pivot axes respectively,
   wherein the means for pivoting the first and second moveable deflector panels pivots the deflector panels in unison and about the same angle, whereby the first and second deflector panels converge inwardly from the respective trailing edges toward respective terminal ends throughout the pivoting and maintain the gap between the terminal ends of the first and second moveable deflector panels.

* * * * *